S. KAYE.
ROLLER BEARING.
APPLICATION FILED MAY 2, 1908.
922,288. Patented May 18, 1909.
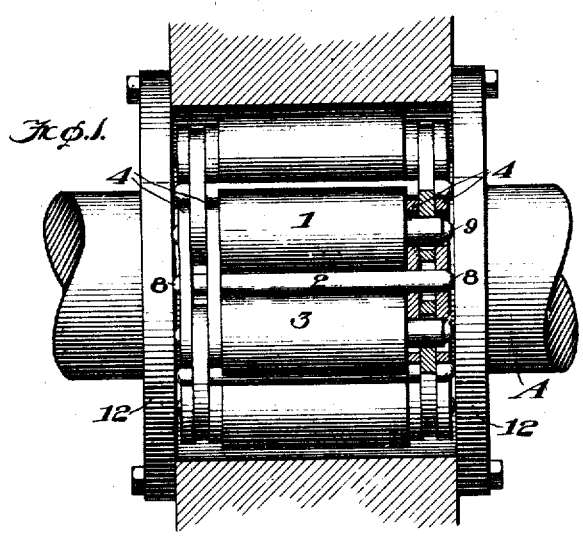
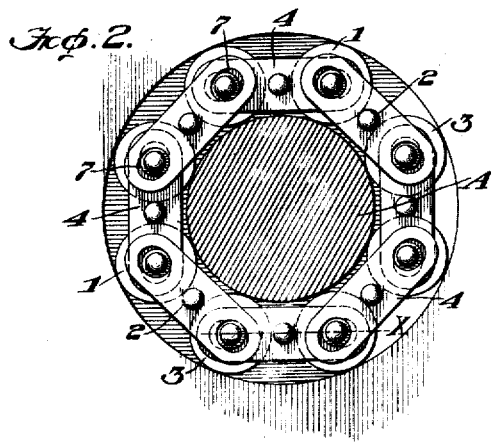
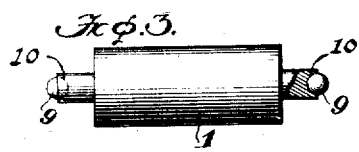
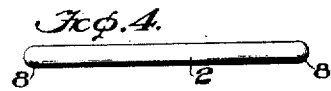
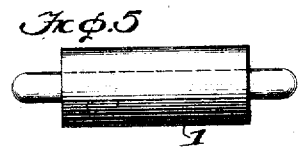
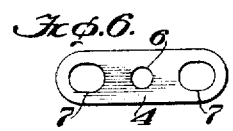
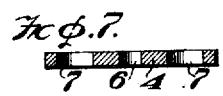
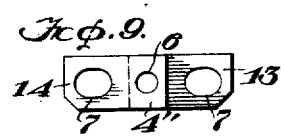

UNITED STATES PATENT OFFICE.

SAMUEL KAYE, OF COLUMBUS, MISSISSIPPI.

ROLLER-BEARING.

No. 922,288.　　Specification of Letters Patent.　　Patented May 18, 1909.

Application filed May 2, 1908. Serial No. 430,574.

*To all whom it may concern:*

Be it known that I, SAMUEL KAYE, a citizen of the United States, residing at Columbus, in the county of Lowndes and State of Mississippi, have invented certain new and useful Improvements in Roller-Bearings, of which the following is a specification.

My invention relates to an improvement in roller bearings, the primary object being to reduce friction to a minimum, and in fact practically eliminate all rubbing friction; and with this object in view, my present invention consists in a plurality of rollers arranged around a journal bearing in sets of threes, with the intermediate roller of a relatively small diameter, and the axial centers of the three rollers in each set held in parallelism and in perfect alinement with one another, and means located at each end of the rollers for maintaining this parallelism and alinement.

My invention further consists in certain novel features of construction, and combinations of parts which will be hereinafter described and pointed out in the claims.

In the accompanying drawings:—Figure 1 is a longitudinal section, Fig. 2 is an end view with the collar removed, Fig. 3 is a view of one of the large rollers, Fig. 4 is a view of one of the small rollers, Fig. 5 is a modification of the roller, Figs. 6 and 7 are views of preferred forms of links. Figs. 8 and 9 are views of modifications of the link and Fig. 10 is an edge view of the form of link shown in Fig. 9.

A, represents the shaft or journal bearing, and the numerals 1, 2, and 3, indicate the rollers forming one set of roller bearings. The rollers 1 and 3, are of corresponding size, and relatively large diameter, and the intermediate roller 2 of much smaller diameter, and interposed between the two larger rollers on either side, in order to prevent rubbing friction as the large rollers turn in the same direction. The axial centers of these sets of rollers are held parallel and in perfect alinement with one another, and this parallelism and alinement is maintained by means of links 4, 4, of any approved construction, three of which forms I have illustrated. The simplest of these is shown in Figs. 6 and 7, and it simply consists of a flat plate of metal having a centrally located round hole 6 therein which the ends of the smaller roller 2 enter and perfectly fit, whereas the end holes 7, 7, are more or less elongated to receive the ends of the larger rollers, thus permitting them to play laterally more or less therein. The link 4' shown in Fig. 8 has an elongated slot 7' which receives the shanks of three of the rollers, and the link 4" shown in Figs. 9 and 10 has a tongue 13 which is adapted to be held in the bifurcated portion 14 of the link next in line by the ends of the larger rollers passing through the holes 7, 7. But by reason of the links having three holes 6, and 7, 7, therein, both the parallelism and alinement of the axial centers of the rollers are always maintained with absolute precision, and this is indicated by the line X in Fig. 2, drawn through the axial centers of one of these sets of rollers. By reason of this perfect alinement of the axial centers of the rollers forming the various sets of rollers maintained by the links, it will be seen that the bearing of the larger rollers upon the smaller intermediate roller is at directly opposite points so that no crowding, twisting, or frictional action takes place, but on the contrary an anti-friction bearing is provided and maintained at all times, which is a feature of my invention, which I desire to emphasize and bring into prominence. If, on the other hand, these axial centers were out of alinement, the tendency would be to crowd the center roller still farther out of alinement, thus greatly increasing the friction, which it is the purpose of my invention to reduce to a minimum. In order to prevent any rubbing friction, should there be any tendency in that direction, either the ends of the rollers may be rounded to reduce their bearing contact as shown in the smaller intermediate roller of Fig. 1, at 8, 8, or balls 9, 9, might be received in concave recesses 10, 10, formed in the ends of the larger rollers, or the outer links might be somewhat increased in thickness beyond the ends of the rollers to receive these balls. Any end thrust which might occasionally result, would then be sustained by the balls 9, 9, on the reduced ends of the rollers.

Two forms of rollers are shown, one in which the reduced ends are an integral part of the main central portion, or they might be made of two parts as shown in Fig. 5, of the drawings, namely comprising a central axis, and a sleeve mounted thereon.

As a slight modification of the form of link described, the links might be made in one piece bifurcated at one end as shown in Figs. 9 and 10. The links are retained on the ends of the rollers by means of boxes or collars 12, 12.

From the foregoing it will be observed that the links through which the ends of the rollers extend, form a circle around the shaft, and move around the latter as the shaft turns. The smaller rollers which revolve in the center orifices of the links, are held in axial alinement and parallelism with the axes of the larger rollers by means of these links, thereby holding the larger rollers separated, as the smaller rollers placed in this way, revolve at just the right speed to accommodate each of the larger rollers with which the intermediate rollers come in contact. The ends of the smaller rollers turn in the round hole at the center of the links, while the larger rollers revolve in the elongated holes in each end of the links, which links take care of the varying conditions of the fit of the rollers against the surface upon which they bear. In this way rubbing friction is not only reduced but eliminated altogether, and at the same time the entire bearing is simple and composed of few parts, and these various parts which go to make up the bearing are so held in alinement and parallelism at all times that the possibility of binding or twisting or frictional contact is precluded.

It is evident that more or less slight changes might be resorted to in the form and arrangement of the several parts described without departing from the spirit and scope of my invention, and hence I do not wish to limit myself to the exact construction herein set forth, but:—

Having fully described my invention, what I claim as new and desire to secure by Letters Patent, is:—

1. A roller bearing comprising a shaft, large and small rollers arranged alternately around the shaft, and links for maintaining an axial alinement of three rollers.

2. A roller bearing comprising a shaft, large and small rollers arranged alternately around the shaft, and links connecting the journals of two large and one small roller in alinement with one another.

3. A roller bearing comprising a shaft, rollers of two diameters alternately arranged, the larger rollers bearing upon the shaft, and the smaller rollers upon the adjacent larger rollers on each side thereof, and links having orifices therein to receive the journals of two large and one small roller to maintain their alinement.

4. A roller bearing comprising a shaft, rollers of two diameters alternately arranged, the larger rollers bearing upon the shaft and the smaller rollers upon the adjacent larger rollers on each side thereof, and links having orifices therein to receive the journals of two large and one small roller to maintain their alinement, the ends of the rollers provided with convex bearings to reduce end thrust friction at that point.

In testimony whereof I affix my signature in presence of two witnesses.

SAML. KAYE.

Witnesses:
HERBERT C. EMERY,
VERNON E. HODGES.